(12) United States Patent
Reed

(10) Patent No.: US 12,297,892 B2
(45) Date of Patent: May 13, 2025

(54) TAPERED DIFFERENTIAL PLANETARY DRIVE

(71) Applicant: Massachusetts Institute of Technology, Cambridge, MA (US)

(72) Inventor: Jake Robert Reed, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 69 days.

(21) Appl. No.: 16/224,768

(22) Filed: Dec. 18, 2018

(65) Prior Publication Data

US 2019/0234489 A1 Aug. 1, 2019

Related U.S. Application Data

(60) Provisional application No. 62/607,273, filed on Dec. 18, 2017.

(51) Int. Cl.
| | |
|---|---|
| *F16H 15/52* | (2006.01) |
| *F16H 1/18* | (2006.01) |
| *F16H 1/28* | (2006.01) |
| *F16H 1/46* | (2006.01) |
| *F16H 13/08* | (2006.01) |
| *F16H 48/11* | (2012.01) |

(52) U.S. Cl.
CPC .............. *F16H 1/18* (2013.01); *F16H 1/2863* (2013.01); *F16H 1/46* (2013.01); *F16H 13/08* (2013.01); *F16H 15/52* (2013.01); *F16H 48/11* (2013.01)

(58) Field of Classification Search
CPC ........ F16H 3/50; F16H 15/10; F16H 55/0806; F16H 15/52; F16H 13/08
USPC ................................................. 475/193, 197
See application file for complete search history.

(56) References Cited

U.S. PATENT DOCUMENTS

| | | | | |
|---|---|---|---|---|
| 5,681,235 | A | * 10/1997 | Ketcham ................. | F16H 15/44 476/1 |
| 6,004,239 | A | * 12/1999 | Makino .................... | F16H 15/52 475/193 |
| 7,575,530 | B2 | * 8/2009 | Sekiya ..................... | F16H 15/52 475/193 |

FOREIGN PATENT DOCUMENTS

JP 02125145 A * 5/1990

* cited by examiner

*Primary Examiner* — Derek D Knight
(74) *Attorney, Agent, or Firm* — Norma E. Henderson

(57) ABSTRACT

A planetary drive includes static and freely rotating outer rings having different diameters, sun gear, and multiple planet gears disposed around the sun so that their axis of rotation is rotated relative to the drive axis, causing each planet to contact each ring at a point along its length. The sun contacts each planet at a point between its contact points with the rings, such that the force at the contact points is enough that the resulting traction can transmit torque with minimal backlash. A carrier supports the planets such that each can rotate about both its own axis and the drive axis. There may be involute teeth or other surface features on parts of the rings, planets, and sun. In a sun-less configuration, the drive is actuated by the carrier. In a single-stage version, the freely rotating ring is absent and output is obtained from rotation of the carrier.

4 Claims, 10 Drawing Sheets

TAPERED DIFFERENTIAL PLANETARY DRIVE

RELATED APPLICATIONS

This application claims the benefit of U.S. Provisional Application Ser. No. 62/607,273, filed Dec. 18, 2017, the entire disclosure of which is herein incorporated by reference.

FIELD OF THE TECHNOLOGY

The present invention relates to electromechanical drives and, in particular, to a tapered planetary drive.

BACKGROUND

Electromechanical systems tend to demand large gear reductions, as their designs favor high-torque outputs, but electric motor drives favor high-speed, low-torque outputs. This problem is a result of motor physics and is difficult to overcome. Where high accuracy positioning is necessary, the gearboxes used must have low backlash, i.e. a small or non-existent 'dead-zone' between directions of engagement. With an in-plane gearbox, i.e. a traditional planetary set, reducing this dead-zone means producing teeth that are extremely close to perfect, engaging on both sides but no further, because this would cause over-constraint and jamming.

In robotics applications, accurate positioning is needed with high torque output, while weight must be minimized. The most common solution to this problem in the state-of-the-art is the harmonic drive. A major disadvantage of harmonic drives, however, is that they require high precision manufacturing and installation.

SUMMARY

A tapered planetary drive according to the invention is a concentric arrangement of gearbox elements where active surfaces are engaged such that they can be pre-loaded, minimizing the need for high precision manufacturing while retaining high precision output. The aim of a 'tapered' drive is to arrange gears so that they may be spring-loaded into an ideal engagement, with not so much force that they are jammed, but with still enough that they are reliably engaged. Alternatively, teeth may be eliminated entirely and only traction used. In either case, the result is a high-reduction, low-backlash gearbox, which is of lower cost than the existing state-of-the-art harmonic drive.

In one aspect of the invention, a tapered differential planetary drive includes a static outer ring, a freely rotating outer ring, wherein the static ring and the freely rotating ring have different diameters, and a sun gear that is actuatable to operate the drive. A plurality of planet gears is disposed around the sun gear, wherein each planet gear is disposed so that its axis of rotation is rotated by an angle relative to the axis of the planetary drive such that the planet gears contact the static ring and the freely rotating ring at some point along their length, and the sun gear is disposed to contact each of the planet gears at a point along their length between the points which contact the static and freely rotating rings, such that the contacting force at the contact points between the static ring, freely rotating ring, planetary gears, and sun gear is great enough that traction between these contact points can be made to transmit torque with minimal or no backlash between directions of engagement. A carrier supports the plurality of planet gears such that each planet gear is free to rotate about its own axis and about the axis of the drive while maintaining separation from the other planet gears. There may be involute, spiral, or other surface features on at least the parts of the static ring and freely rotating ring that contact the planet gears, on at least the parts of the planet gears that contact the static ring, freely rotating ring, and sun gear, and on at least the parts of the sun gear that contact the planet gears. The surface features may be involute teeth or knurls. A DC motor may be used to actuate the sun gear.

In another aspect of the invention, a sun-less tapered differential planetary drive includes a static outer ring and a freely rotating outer ring, wherein the static ring and the freely rotating ring have different diameters. A plurality of planet gears is disposed within the static and freely rotating rings, wherein each planet gear is disposed so that its axis of rotation is rotated by an angle relative to the axis of the planetary drive such that the planet gears contact the static ring and the freely rotating ring at some point along their length, such that the contacting force at the contact points between the static ring, freely rotating ring, and planetary gears is great enough that traction between these contact points can be made to transmit torque with minimal or no backlash between directions of engagement. A carrier, which is actuatable to operate the drive, supports the plurality of planet gears such that each planet gear is free to rotate about its own axis and about the axis of the drive while maintaining separation from the other planet gears. There may be involute, spiral, or other surface features on at least the parts of the static ring and freely rotating ring that contact the planet gears and on at least the parts of the planet gears that contact the static ring and freely rotating ring. The surface features may be involute teeth or knurls. A DC motor may be used to actuate the carrier.

In a further aspect of the invention, a single-stage tapered differential planetary drive includes a static outer ring and a sun gear that is actuatable to operate the drive. A plurality of planet gears is disposed around the sun gear, wherein each planet gear is disposed so that its axis of rotation is rotated by an angle relative to the axis of the planetary drive such that the planet gears contact the static ring at some point along their length, and wherein the sun gear is disposed to contact each of the planet gears at a point along their length, such that the contacting force at the contact points between the static ring, planetary gears, and sun gear is great enough that traction between these contact points can be made to transmit torque with minimal or no backlash between directions of engagement. A freely rotating carrier supports the plurality of planet gears such that each planet gear is free to rotate about its own axis and about the axis of the drive while maintaining separation from the other planet gears, and the rotation of the carrier is the output of the drive. There may be involute, spiral, or other surface features on at least the parts of the static ring that contact the planet gears, on at least the parts of the planet gears that contact the static ring and sun gear, and on at least the parts of the sun gear that contact the planet gears. The surface features may be involute teeth or knurls. A DC motor may be used to actuate the sun gear.

BRIEF DESCRIPTION OF THE DRAWINGS

Other aspects, advantages and novel features of the invention will become more apparent from the following detailed description of the invention when considered in conjunction with the accompanying drawings, wherein.

DETAILED DESCRIPTION

A tapered differential planetary drive according to the invention is a concentric arrangement of gearbox elements where active surfaces are engaged such that they can be pre-loaded, minimizing the need for high precision manufacturing while retaining high precision output (i.e. low backlash). A drive according to the invention may be manufactured with molding techniques and is resilient to some degree of manufacturing error. The aim of a "tapered" drive is to arrange gears so that they may be spring-loaded into an ideal engagement, not with so much force that they are jammed, but with enough that they are reliably engaged. Alternatively, teeth may be eliminated entirely and only traction used, which is possible because pre-loading is relatively simple in this arrangement. In either case, the result is a high-reduction, low-backlash gearbox, which is of lower cost than the existing state-of-the-art harmonic drive.

Figure 1:
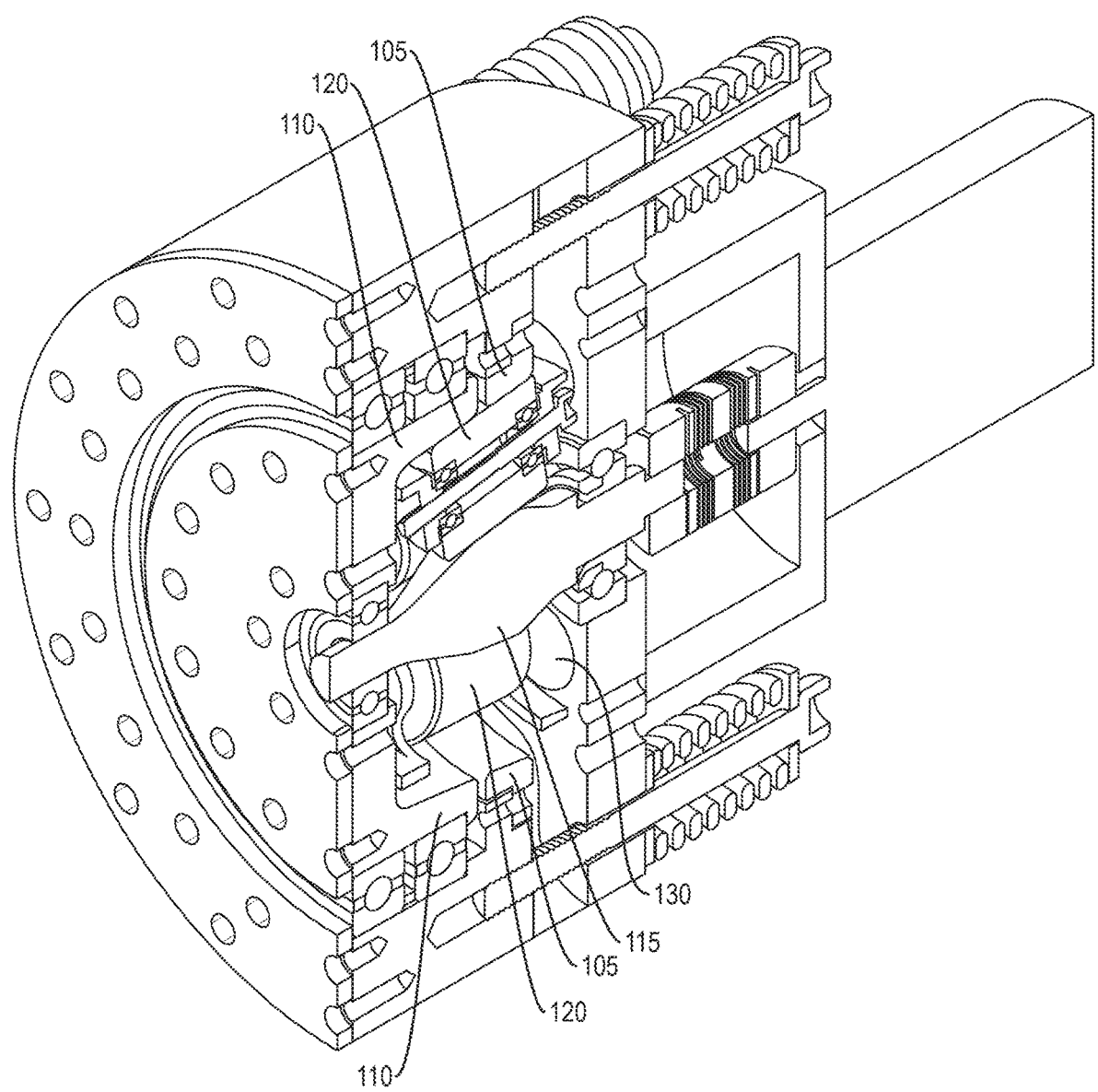
FIG. 1 is an axonometric cross-section of example embodiment of a tapered differential planetary drive, according to the invention.

FIG. 1 depicts an example embodiment of a tapered differential planetary drive according to the invention. As shown in FIG. 1, the drive is composed of one static outer ring 105 and one freely rotating outer ring 110, one sun gear 115 and some number of planets 120. The two rings 105, 110 are of different diameters. Planets 120 are disposed such that their axis of rotation is rotated by some angle $\theta_P$ relative to the axis of the drive, such that they contact both rings 105, 110 at points along their length. The sun gear 115 is then disposed to contact the planets 120 at a point along their length between the points which contact the static 105 and freely rotating 110 outer rings. Planets 120 are arranged in a carrier 130 such that they are free to rotate about their own axis and about the axis of the drive, but maintain separation from each other.

Figure 2:
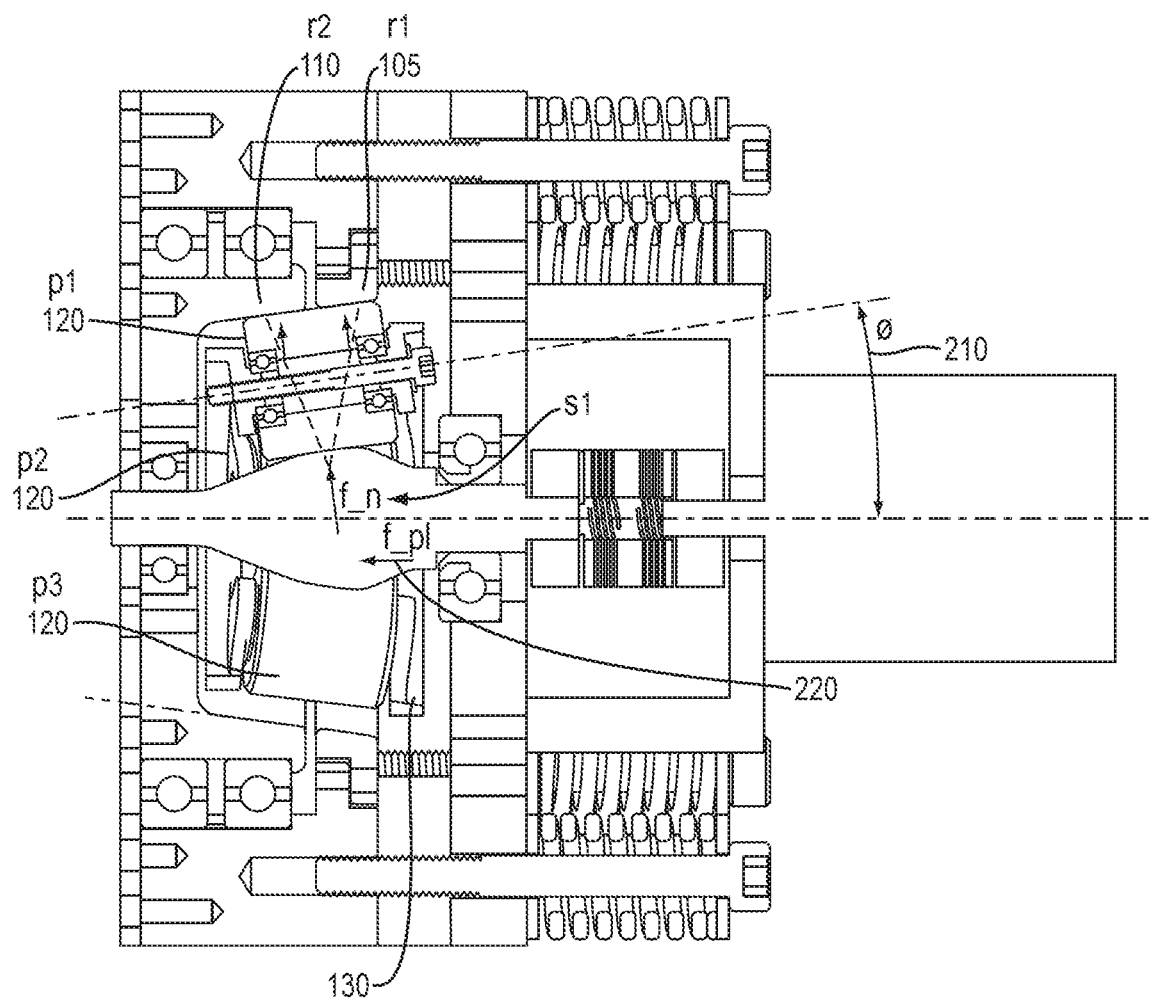
FIG. 2 is a cross-section of the example embodiment of a tapered differential planetary drive of FIG. 1, with contact points and angles labelled.

FIG. 2 depicts the example embodiment of a tapered differential planetary drive of FIG. 1, in section with contact points and angles labelled. As shown in FIG. 2, the rotary drive is composed of two rings 105 (R1) and 110 (R2), one sun gear 115 (s1) and some n number of planets 120 (p0→pn). The first ring R1 105 is stationary and has its drive side facing towards the axis of the drive, and is of some diameter $d_{R1}$. The second ring R2 110 similarly has its drive side facing towards the axis of the drive, but is free to rotate, and is of some diameter greater or less than that of stationary ring 105 R1, by some amounty such that $d_{R2}=d_{R1}\pm y$. Planets 120 p0→pn are of some constant diameter $d_p$ and are disposed such that their axis of rotation is rotated by some angle 210 $\theta_P$ relative to the axis of the drive, such that they contact both ring 105 R1 and ring 110 R2 at two points along their length. The sun gear 115 is then disposed to contact the planets 120 at some point along their length between the points which contact ring 105 R1 and ring 110 R2, wherein the diameter $d_s$ of sun 115 is twice the distance between the axis of the drive and the edge of any planet 120 at that length along the planet 120.

Planets are disposed in a carrier 130 such that they are free to rotate about their own axis and about the axis of the drive, and that small changes in angle 210 $\theta_P$ are permissible (i.e. the stiffness against that axis is small), but such that rotation along the axis which is perpendicular to the planet's axis, and intersects at some point the axis of the drive, is low (i.e. that stiffness in this axis is large).

Preloading.

As shown in FIG. 2, this layout allows for the sun to be pre-loaded with some force 220 $F_{pl}$ applied along the axis of the drive into the planets 120, and thus the planets 120 to be preloaded into the rings 105, 110, such that either the contacting force between bare and featureless drive surfaces, amplified by the taper, as $$F_n = F_{pl}/(2n*\sin(\theta_P)),$$

is great enough that traction between these bare surfaces can be made to transmit torque, or such that involute, spiral, or other surface features (i.e. simple knurls) can be made to engage such that they will transmit torque with minimal or no backlash between directions of engagement.

Gear Ratio.

The ratio between the rotation of the planet carrier C and the sun S can be described with the same equation used to describe a traditional planetary gear set:

$$R_{carrier} = \frac{d_S}{d_S + d_{R1}}$$

where $R_{carrier}$ is the ratio between the number of turns of the sun S and the number of turns of the planet carrier C, and $d_S$ and $d_{R1}$ are diameters of the sun S and the static ring R1, respectively.

While a planet makes one revolution, the path traced by a point on the planet's circumference is equal in length to the circumference of R1, while it has traction on R2, which is of a smaller diameter. As a result, while R1 is fixed during the revolution of a planet, a point on the circumference of R2 must displace in order to make up the difference. This difference is divided by the total circumference of R2 in order to arrive at the portion-of-one-rotation that point on the circumference of R2 has traveled.

All three terms are of type circumference at this point, so diameter, radius, or if using teeth (provided they are of the same pitch), the number of teeth on each respective part of the drive can easily be substituted. The ratio describing the number of turns of R2 relative the number of turns of the carrier is therefore:

$$R_{harmonic} = \frac{d_{R2} - d_{R1}}{d_{R2}}$$

This is a common description also of harmonic drives. Tying these together, it can be seen that the complete ratio between the turns of the sun and the turns of the output ring is:

$$R_{tdpd} = \frac{d_S}{d_S + d_{R1}} * \frac{d_{R2} - d_{R1}}{d_{R2}}$$

Critically, it is seen that a small difference between $d_{R2}$ and $d_{R1}$ creates a very large reduction.

Contact Points.

It is important to note that, while the planets have essentially cylindrical profiles, all other contacting bodies are essentially conical in section, making them non-mating surfaces. To overcome this, a very slight spherical profile must be introduced to the surfaces of R1, R2, and the sun, such that the point where they contact the planets is kinematically rendered as a single point, rather than a line, as shown in FIG. 2. It is also possible to retain a conical section on R1, R2, and the sun, but to introduce spherical profiles along the length of the planets. However, this is currently not preferred due to manufacturing considerations.

Degrees of Freedom.

Planets are disposed in a carrier such that they are free to rotate about their own axis and about the axis of the drive, and that small changes in $\theta_P$ are permissible (i.e. the stiffness against that axis is small), but such that rotation along the axis that is perpendicular to the planet's axis and intersects the axis of the drive at some point is low (i.e. such that stiffness in this axis is large with respect to against $\theta_P$). Additionally, the sun gear must be free to move forwards and backwards about the axis of the drive. Without these degrees of freedom, the gearbox becomes over-constrained and may be subject to lockups during operation.

Involute Teeth on Contacting Surfaces.

Rather than simply pre-loading featureless surfaces against each other such that the force of friction between them is great enough to transmit torque, it is possible to add surface features (i.e. simple knurls) or involute teeth to mating surfaces. This allows for greater torque to be transmitted with less pre-loading and parasitic loss. This constrains some design parameters, however, as the diameters of the rings, planets, and sun must be multiples of the tooth pitch. Critically, this limits the difference between $d_{R1}$ and $d_{R2}$ to be no less than one tooth-length in difference. However, tooth pitch on R2 and R1 may be varied independently, allowing for precise control over the taper angle while maintaining a singular-tooth difference between R2 and R1.

Figure 3:
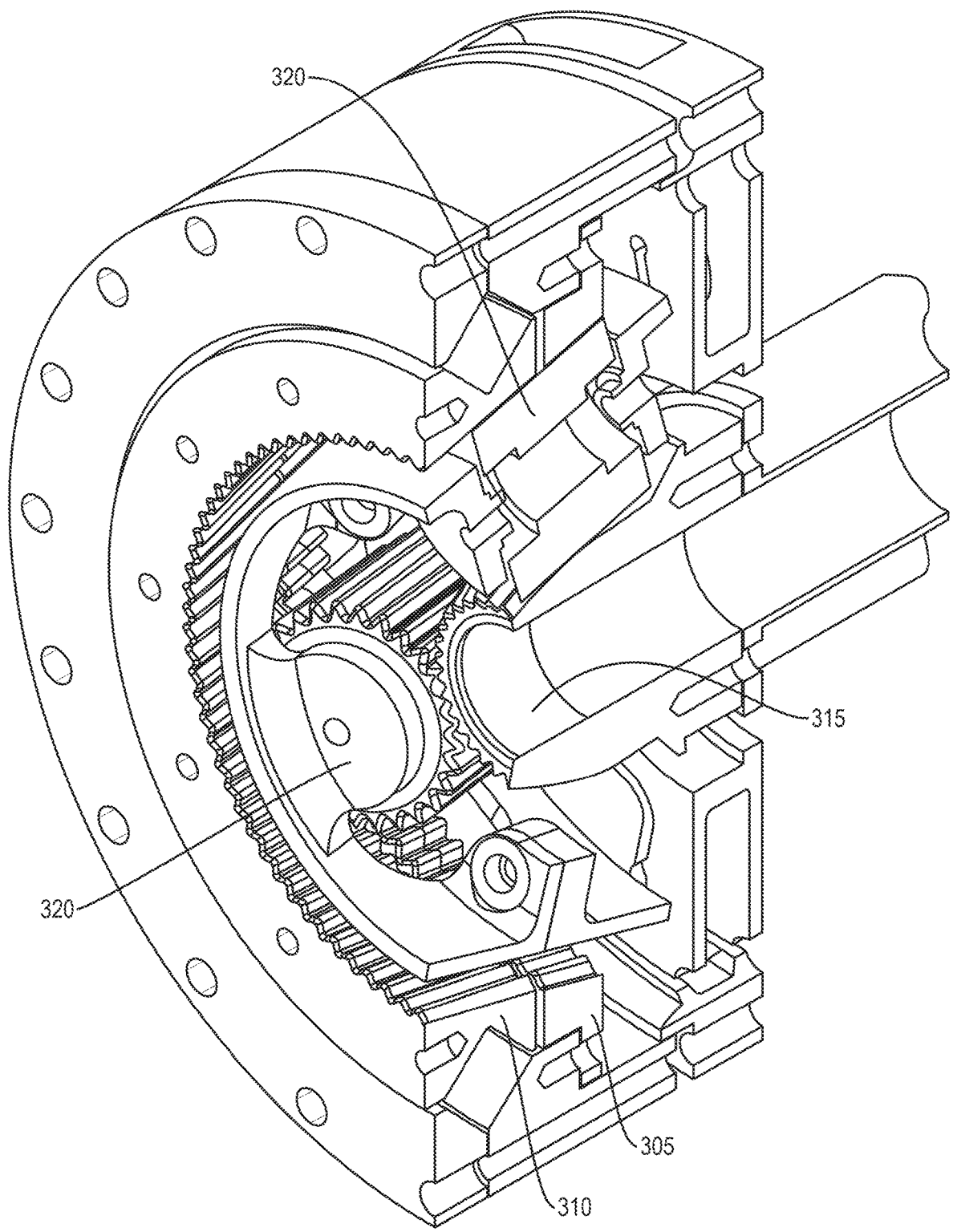
FIG. 3 is an axonometric cross-section of an example embodiment of a tapered differential planetary drive with involute teeth, according to one aspect of the invention.
Figure 4:
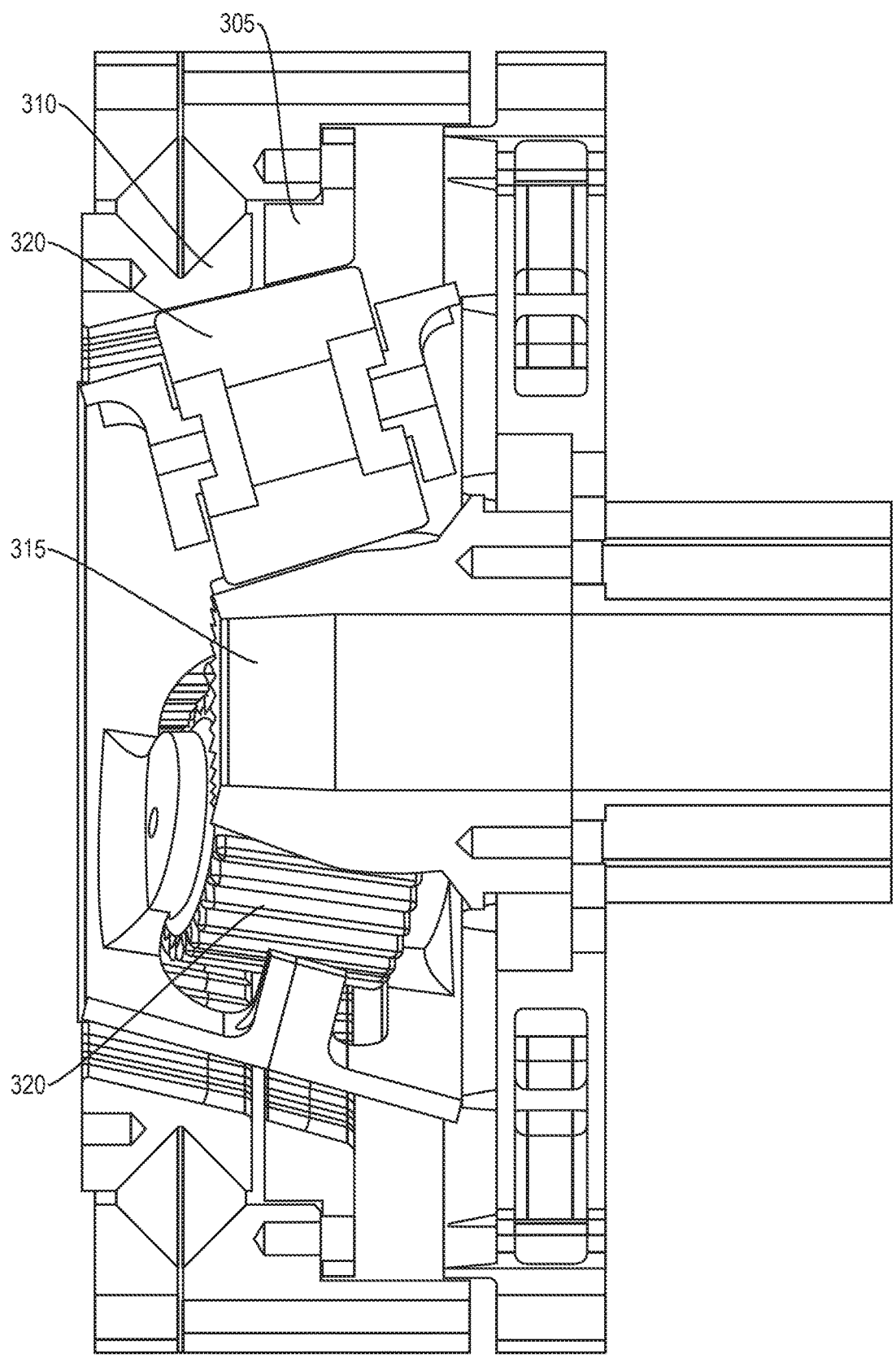
FIG. 4 is a cross-section of the example embodiment of a tapered differential planetary drive with involute teeth of FIG. 3.

FIGS. 3 and 4 depict an example embodiment of a tapered differential planetary drive with involute teeth, in axonometric view and sectioned (FIG. 3) and in cross-section view (FIG. 4). Seen in FIGS. 3 and 4 are static outer ring 305 and freely rotating toothed outer ring 310, toothed sun gear 315 and toothed planets 320. Rings 305, 310 are of different diameters. Toothed planets 320 are disposed such that their axis of rotation is rotated by angle Op relative to the axis of the drive, such that they contact both rings 305, 310 at points along their length. Sun gear 315 is then disposed to contact planets 320 at a point along their length between the points which contact static ring 305 and rotating ring 310. Planets 320 are arranged in carrier 330 such that they are free to rotate about their own axis and about the axis of the drive, but maintain separation from each other.

Sunless Variation.

Figure 5:
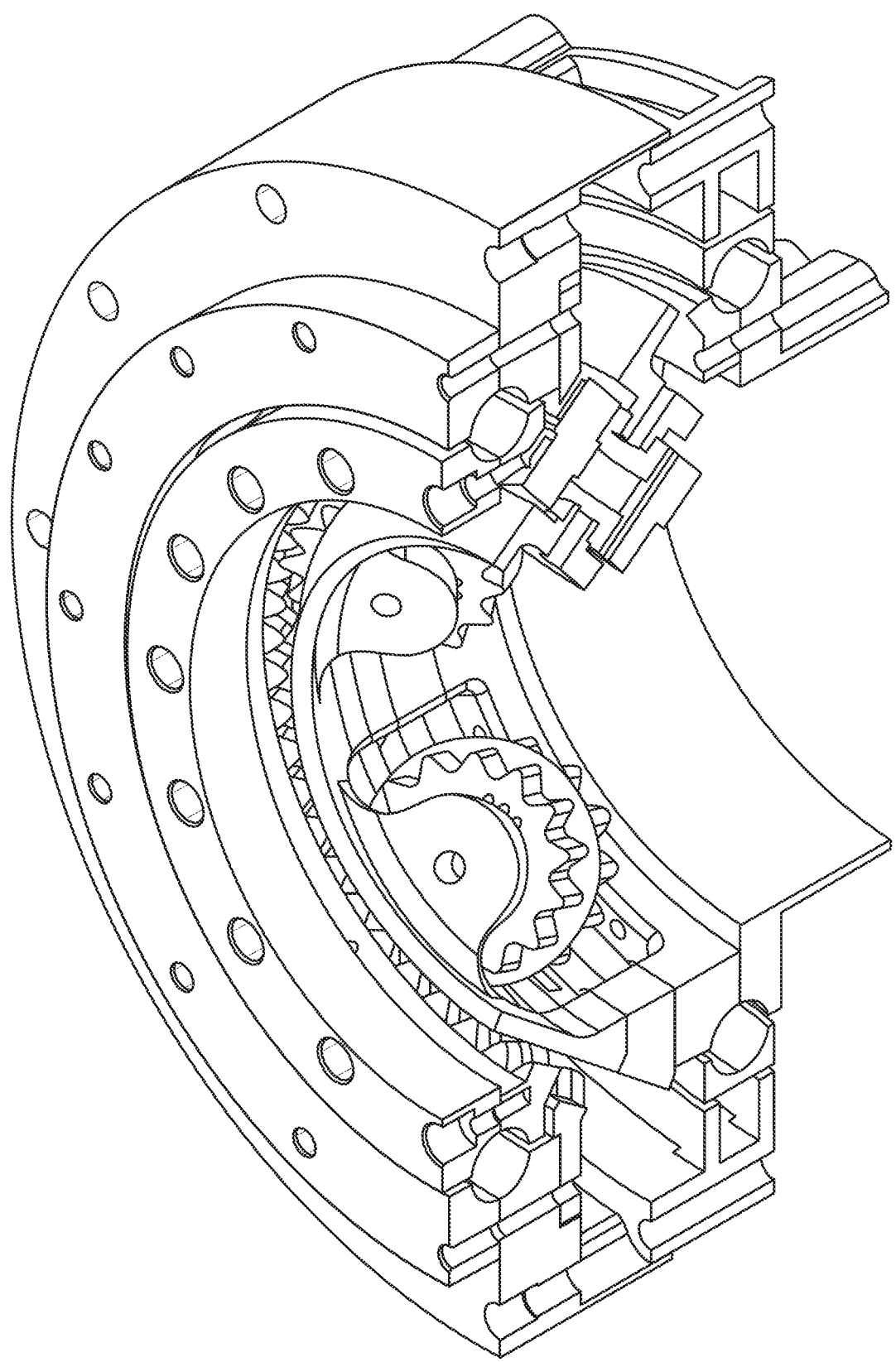
FIG. 5 is an axonometric cross-section of an example embodiment of a tapered differential planetary drive without a sun gear and with involute teeth, according to another aspect of the invention.
Figure 6:
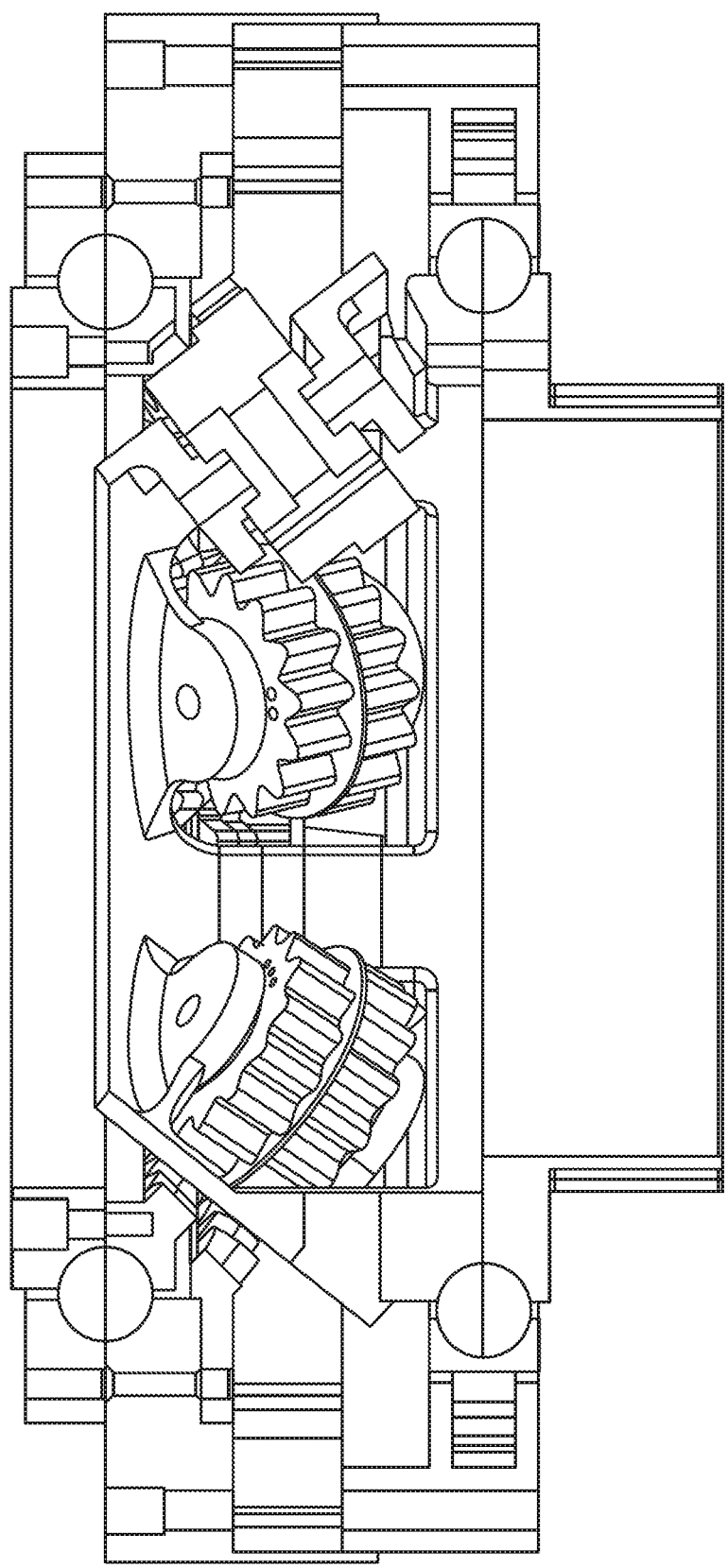
FIG. 6 is a cross-section of the example embodiment of a tapered differential planetary drive without a sun gear and with involute teeth of FIG. 5.

It is possible to further reduce the design complexity of the tapered differential planetary gear according to the invention by eliminating the requirement for a driving a sun gear by directly driving the planet carrier. However, this does make it difficult to properly preload both sides of the planetary gear into their respective rings. This embodiment has also been reduced to practice, as seen in FIG. 5 and FIG. 6, which depict an example embodiment of a tapered differential planetary drive without a sun gear and with involute teeth, in an axonometric view and sectioned (FIG. 5) and in a cross-section view (FIG. 6).

Single Stage Variation.

The concepts embodied in the drive of the invention may also be used for a single-stage planetary drive, which are becoming very common in dynamic robots (i.e. the MIT Cheetah) that use high-torque density motors with relatively low reductions (on the order of 1:3). In applications where a high reduction is unwarranted, it is possible to use the tapered layout for concentric pre-loading of a single-stage planetary arrangement. In this case, the planet carrier is directly connected to the output of the drive, and a sun is used to drive the planets. This variation is likely to be useful in highly dynamic robotics, where the maximization of motor torque density is often preferred over the maximization of gearbox ratios, but some small ratio must be maintained (for example, on the order of 3:1 to 9:1) and precision output is still necessary.

Figure 7:
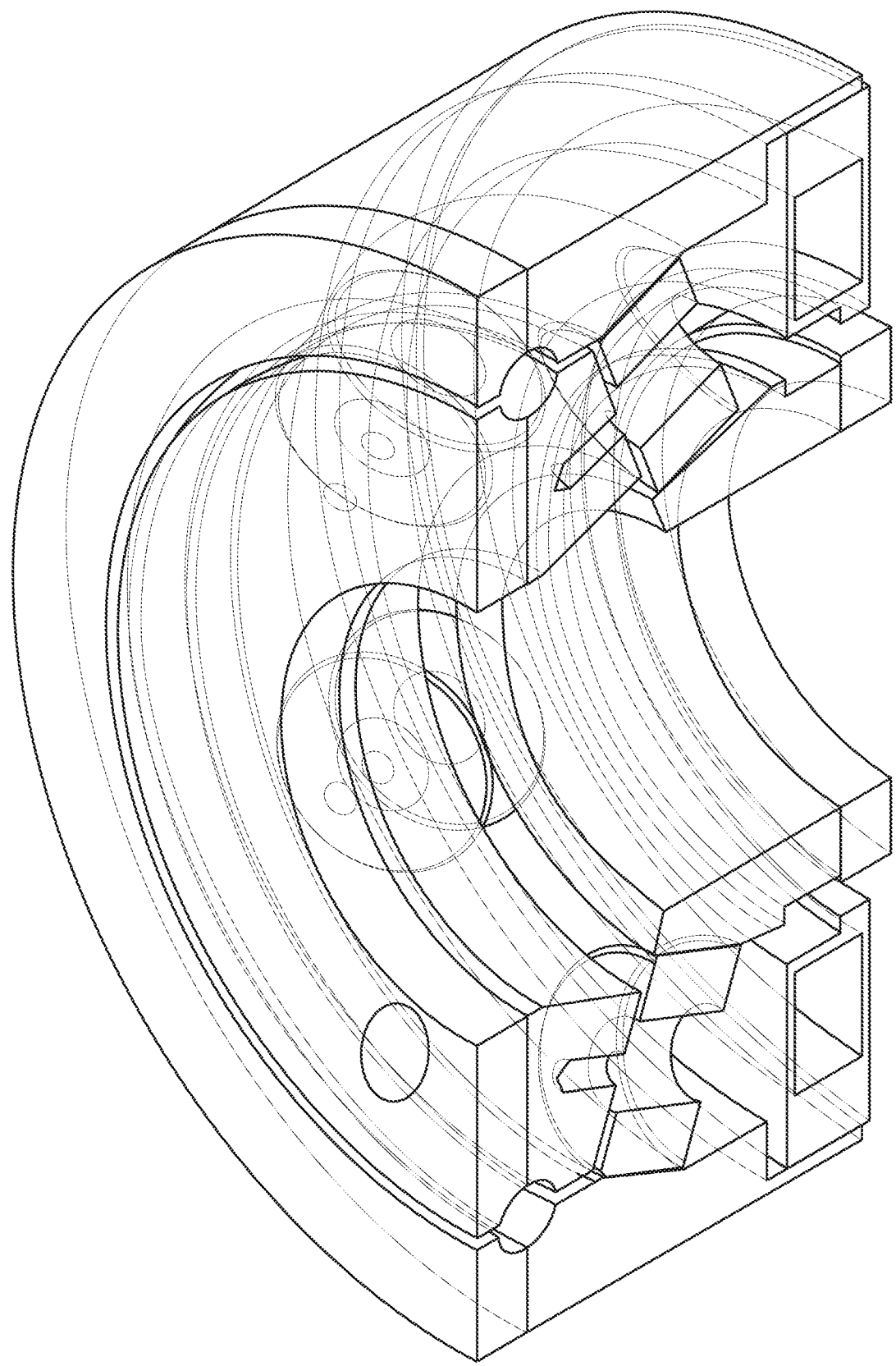
FIG. 7 is an axonometric cross-section of an example embodiment of a tapered planetary drive with one stage, according to a further aspect of the invention.
Figure 8:
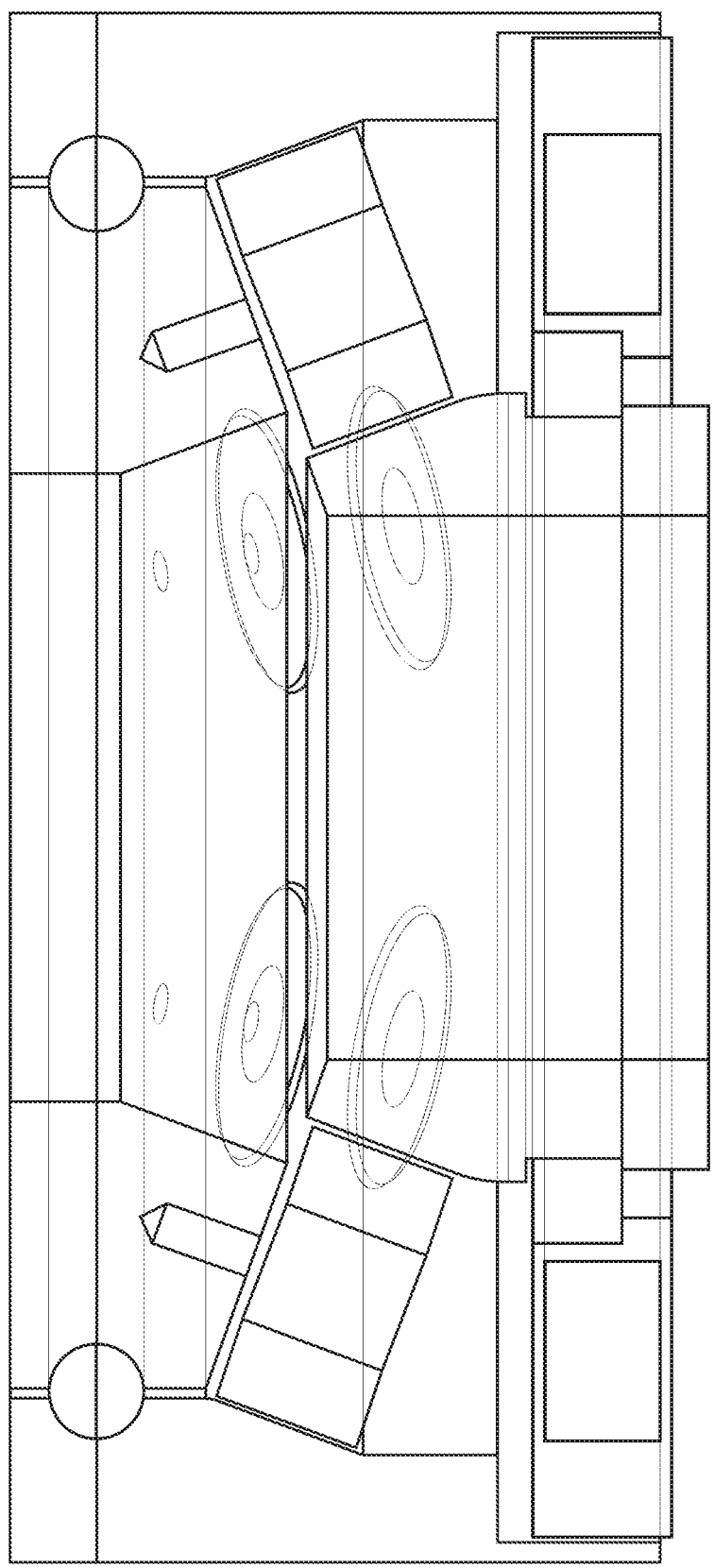
FIG. 8 is a cross-section of the example embodiment of a tapered planetary drive with one stage of FIG. 7.

FIGS. 7 and 8 depict an example embodiment of a tapered planetary drive with one stage, in axonometric view (FIG. 7) and in a cross-section view (FIG. 8). The same notion of tapered and preloaded planets is used. In this case, the planets do not contact also a second ring, R2, but instead have their axis connected to a freely rotating carrier, whose rotation is the output. Using this design, it is possible to avoid the constraint where the number of teeth on R2 must be less or more than the number of teeth on R1 by a multiple of n. The complication is that planets have to have some rotational offset along their length so that teeth still engage on the ring. A length along the planet which engages with the sun, prior to the offset, is also necessary.

Design and Material Considerations.

Size of Preloading Forces.

While $N_n$ is likely very small in drives with teeth, it becomes quite large in traction drive applications, where high contacting force and static friction is used to transmit torque, and is therefore worth estimating. Given a drive whose desired output is 50 Nm, a size capable of operating the lower-three joints in a 600 mm long robot arm, whose payload is 3 Kg, then the total tangential force acting between the planets and R2 can be described as:

$$f_{tr2} = (q_{target}/r_{R2})/u_{fs}$$

With a designed radius of R2 near 50 mm, and a coefficient of static friction $u_{fs}$ near 0.25 (a low estimate for aluminum on aluminum, similar for steel to steel) the tangential force is 4000N. This is distributed to some success across the planets, so for 5 planets, there is 800N of normal force to apply. In addition, this 800N must be applied between R1 and the planets as well as between R2 and the planets, and so the total $F_n$ applied between the sun and the planets (each) is 1600N. This is large, but within the range of acceptable loads for most metals. The $F_{pl}$ that is axially applied to the sun gear is smaller due to its wedge-like arrangement. Since $$F_n = F_{pl}/(2N + \sin(\theta_P)),$$

if the angle of taper is roughly 5 degrees, then $F_{pl}$=320N.

Some loss due to rolling friction takes place at each of these sites of contact, where material is compressed due to the large $F_n$ that is applied. For this reason, materials that exhibit low hysteresis and high stiffness as well as high $u_{fs}$ are extremely desirable.

Taper Size and Constraints when driving surface features are used.

When drive-side surfaces are featureless, no constraints are placed on the size of the difference between $d_{R1}$ and $d_{R2}$, and so the reduction ratio can easily be made quite large by bringing this difference close to 0. An excessively slight taper (i.e. small $\theta_P$) seems likely to create difficulties in practice, as planets become more likely to lock into over-preloaded configurations, as small $F_{pl}$ quickly amplifies to large $F_n$.

When drive-side surface features are used, i.e. involute teeth, the number of teeth on R2, $NT_{R2}$, must be less than $NT_{R1}$ by some multiple of $N_P$, the number of planets. In a similar fashion, the number of teeth on the sun, $N_{TS}$, should be a multiple of n. There is no constraint on the number of teeth on a planet.

Figure 9:
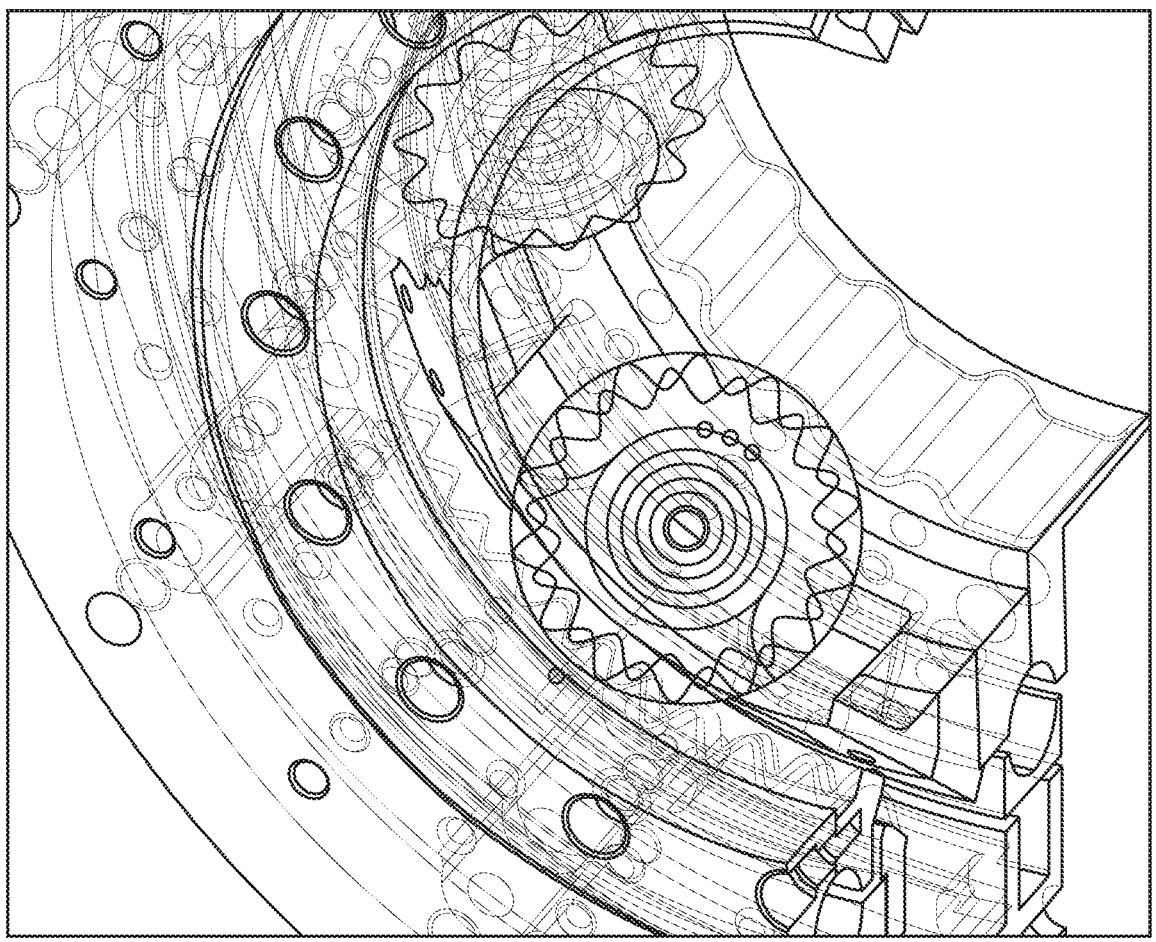
FIG. 9 depicts an example embodiment of a planet whose second section has been rotated to maintain engagement with R2, according to a further aspect of the invention.

However, this limitation, which limits the transmission ratio, can be overcome to the point where the $NT_{R2}$ may be less than the $NT_{R1}$ by a count of only one. In order to do this, the planet is split into two sections—one contacting R2 and the sun, and one contacting R1. The section contacting R2 is rotated along the planet's axis such that it maintains satisfactory alignment with the surface features in R2, while the first section maintains alignment with the surface features of R1. This is shown in FIG. 9, which depicts an example embodiment of a planet whose second section has been rotated to maintain engagement with R2.

Design tradeoffs exist here: where a minimum of two planets is possible, and such a design allows for the smallest difference between $NT_{R1}$ and $NT_{R2}$, it is somewhat unstable. Three planets seems ideal at first, as it is stable with a similarly small difference. However, a number of planets on the order of 5-6 may be advantageous, when used in conjunction with a smaller tooth pitch, such that ratios remain similar, while loads are distributed across multiple contact patches. Because the gears are preloaded and can be guaranteed to be engaged at all times, it seems wise to use a larger number of smaller teeth, as smaller peak loads will be seen in the material.

Shear Along Tapered Surfaces.

For both featured (toothed) and featureless drive engagements, because of the difference in circumference along the length of R1 and R2, some shearing force across these faces is exerted as the planets rotate past, as it would for a long cylindrical roller 'turning' along a flat plane. With flat, traction-based engagement, this creates large problems, as the force of static friction must be overcome to move the system at all. The best solution here is to introduce a slight radius in the contacts, such that a discrete contact point is created. There will be some shearing, but this will be highly reduced, as the $F_n$ exerted between components will drop away drastically as one moves away from the contact point. A similar solution is possible with involute teeth, where the point-of-contact forms an 'ideal' involute condition, but individual teeth are tapered across the length of each given ring (and sun) such that they do not jam. Ring and sun teeth could also see a similar 'radiused' shape. There is perhaps some spiral involute possible that overcomes these issues, by allowing the point-of-contact to roll 'down' the rings and 'out' such that radius is maintained.

Material and Manufacturing Considerations.

Featureless traction-drive systems must use materials that have either very large coefficients of friction or very high stiffnesses, as they will undergo large surface loading. Unfortunately, large stiffnesses tend to coincide with small coefficients of friction. Experimentation with surface finish will likely make up a good deal of the solution to a traction-drive based solution.

Plastics may be found with large coefficients of friction that will work, especially if planets, for example, are made with some rubber-type skin that drives the coefficient of static friction near or past 1. In this case, there are likely issues with losses due to rolling friction. Toothed systems will necessarily require some high-stiffness, high-hardness, low coefficient of friction material, as is common in all types of gearboxes. Harmonic Drive Flex Splines demand a material that is hard at the teeth, but also flexible along their length, and this material dichotomy is what drives much of the cost in such a system. With a preloaded drive, nothing is meant to flex, save the pre-loading springs, and so planets and rings can be made from a more commonly available set of gear materials. Injection-molded nylon gears, such as in cordless drill transmissions, or sintered metal parts, or traditional cut or milled steels, are viable high-volume materials.

Entirely different manufacturing methods may be used with a tapered drive than with a harmonic drive. The resultant decrease in manufacturing cost and the relative ease of assembly of the drive, when coupled with modern controls electronics and position sensors, could see robotic hardware approach costs where individuals or very small businesses could purchase and employ them Design Incorporating a Brushless DC Motor.

It will often be necessary to incorporate a brushless DC motor (BLDC) into the gearbox apparatus. In one solution, the BLDC's rotor is disposed to float along with the preloaded sun gear, while its stator is stationary relative the gearbox apparatus chassis. This minimizes active weight in the system, minimizing design constraints on any system (springs or flexure) used to pre-load the sun-stator system into the gearbox.

Figure 10:
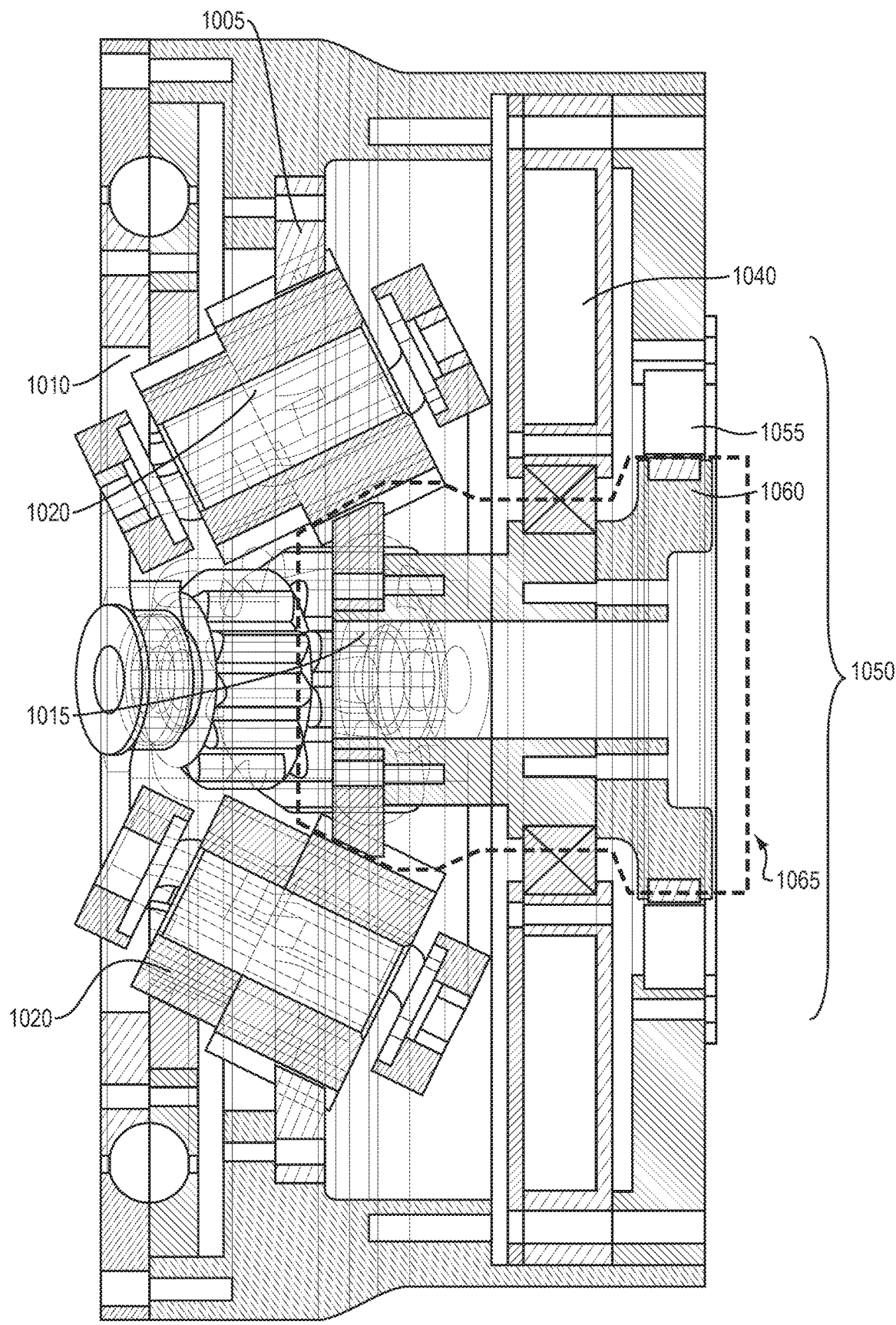
FIG. 10 depicts an example embodiment of a drive incorporating a brushless DC motor, according to an aspect of the invention.

An illustration of an example embodiment of a drive incorporating a brushless DC motor is shown in FIG. 10. Shown in FIG. 10 are static (fixed) ring 1005, free ring 1010, sun gear 1015 and planets 1020, 1025. Planets 1020 1025 are disposed such that their axis of rotation is rotated by some angle $\theta_P$ relative to the axis of the drive by preloading flexure 1040. Sun gear 1015 is driven by brushless DC motor 1050, comprising stator 1055 and rotor 1060, and representing a sprung mass 1065.

While preferred embodiments of the invention are disclosed in the attached materials, many other implementations will occur to one of ordinary skill in the art and are all within the scope of the invention. Each of the various embodiments described may be combined with other described embodiments in order to provide multiple features. Furthermore, while the attached materials describe a number of separate embodiments of the apparatus and method of the present invention, what has been described is merely illustrative of the application of the principles of the present invention. Other arrangements, methods, modifications, and substitutions by one of ordinary skill in the art are therefore also considered to be within the scope of the present invention.

What is claimed is:

1. A tapered differential planetary drive, comprising:
   a static outer ring;
   a freely rotating outer ring, wherein the static ring and the freely rotating ring have different diameters;
   a tapered sun gear, wherein the drive has an axis along which the tapered sun gear is disposed, and wherein the sun gear is actuatable to operate the drive;
   a plurality of constant-diameter planet gears disposed around the tapered sun gear, wherein each planet gear is disposed so that its axis of rotation is rotated by an angle relative to the axis of the planetary drive such that the planet gears contact the static ring and the freely rotating ring at some point along their length, and wherein the sun tapered gear is disposed to contact each of the planet gears at a point along their length between the points which contact the static and freely rotating rings and wherein the diameter of the tapered sun gear at the point of contact with each planet gear is twice the distance between the axis of the drive and the edge of that planet gear at the point of contact, such that the contacting force at the contact points between the static ring, freely rotating ring, planetary gears, and sun gear is great enough that traction between these contact points can be made to transmit torque with minimal or no backlash between directions of engagement; and
   a carrier supporting the plurality of planet gears such that each planet gear is free to rotate about its own axis and about the axis of the drive while maintaining separation from the other planet gears.

2. The planetary drive of claim 1, further comprising involute, spiral, or other surface features on at least the parts of the static ring and freely rotating ring that contact the planet gears, on at least the parts of the planet gears that contact the static ring, freely rotating ring, and sun gear, and on at least the parts of the sun gear that contact the planet gears.

3. The planetary drive of claim 1, further comprising a DC motor for actuating the sun gear.

4. The planetary drive of claim 3, wherein the DC motor is brushless.

* * * * *